(12) United States Patent
Snyder

(10) Patent No.: US 8,015,787 B2
(45) Date of Patent: Sep. 13, 2011

(54) CLUSTERED INLET PARTICLE SEPARATOR

(75) Inventor: Philip Harold Snyder, Avon, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 1099 days.

(21) Appl. No.: 11/633,222

(22) Filed: Dec. 4, 2006

(65) Prior Publication Data

US 2010/0221100 A1    Sep. 2, 2010

Related U.S. Application Data

(63) Continuation of application No. PCT/US2006/023883, filed on Jun. 20, 2006.

(60) Provisional application No. 60/692,428, filed on Jun. 20, 2005.

(51) Int. Cl.
*F02G 3/00* (2006.01)
(52) U.S. Cl. .................. 60/39.092; 55/306; 244/53 B
(58) Field of Classification Search ............... 60/39.092; 55/306; 244/53 B; 415/121.2
See application file for complete search history.

(56) References Cited

U.S. PATENT DOCUMENTS

| 2,931,460 | A | 4/1960 | McEachern et al. |
|---|---|---|---|
| 3,368,332 | A | 2/1968 | Hooper et al. |
| 3,421,296 | A | 1/1969 | Beurer, Sr. |
| 3,449,891 | A | 6/1969 | Shohet et al. |
| 3,465,950 | A | 9/1969 | Freid et al. |
| 3,513,641 | A | 5/1970 | Hopper et al. |
| 3,521,431 | A | 7/1970 | Connors et al. |
| 3,534,548 | A | 10/1970 | Connors |
| 3,616,616 | A | 11/1971 | Flatt |
| 3,673,771 | A | 7/1972 | Dickey |
| 3,766,719 | A | 10/1973 | McAnally, III |
| 3,778,983 | A | 12/1973 | Rygg |
| 3,832,086 | A | 8/1974 | Hull, Jr. et al. |
| 3,970,439 | A | 7/1976 | Murphy |
| 3,978,656 | A | 9/1976 | Murphy |
| 3,993,463 | A | 11/1976 | Barr |
| 4,198,219 | A | 4/1980 | Krisko |
| 4,265,646 | A | 5/1981 | Weinstein et al. |
| 4,268,284 | A | 5/1981 | Kent et al. |
| 4,509,962 | A | 4/1985 | Breitman et al. |
| 4,527,387 | A | 7/1985 | Lastrina et al. |
| 4,591,312 | A | 5/1986 | Wenglarz |
| 4,592,765 | A | 6/1986 | Breitman et al. |
| 4,617,028 | A | 10/1986 | Ray et al. |
| 4,685,942 | A | 8/1987 | Klassen et al. |
| 4,702,071 | A | 10/1987 | Jenkins et al. |

(Continued)

FOREIGN PATENT DOCUMENTS

GB    1201096    8/1970

(Continued)

OTHER PUBLICATIONS

EP 06 78 5142 Supplementary Search Report, Oct. 7, 2009, Rolls-Royce North American Technologies, Inc.

(Continued)

*Primary Examiner* — Louis Casaregola
(74) *Attorney, Agent, or Firm* — Krieg DeVault LLP

(57) ABSTRACT

A particle separator for a gas turbine engine is disclosed. The particle separator includes flow dividers operable to divide flow in a gas turbine engine particle separator and flow scavengers operable to scavenge flow in a gas turbine engine particle separator.

6 Claims, 3 Drawing Sheets

U.S. PATENT DOCUMENTS

| | | | |
|---|---|---|---|
| 4,704,145 A | 11/1987 | Norris et al. |
| 4,928,480 A | 5/1990 | Oliver et al. |
| 5,039,317 A | 8/1991 | Thompson et al. |
| 5,139,545 A | 8/1992 | Mann |
| 5,222,693 A | 6/1993 | Slutzkin et al. |
| 5,268,011 A | 12/1993 | Wurz |
| 5,320,651 A | 6/1994 | Drummond |
| 5,746,789 A | 5/1998 | Wright et al. |
| 5,827,043 A | 10/1998 | Fukuda et al. |
| 6,129,509 A | 10/2000 | Cousin et al. |
| 6,134,874 A | 10/2000 | Stoten |
| 6,499,285 B1 | 12/2002 | Snyder |
| 6,508,052 B1 | 1/2003 | Snyder et al. |
| 6,698,180 B2 | 3/2004 | Snyder |
| 7,374,593 B2 * | 5/2008 | Snyde | 55/440 |
| 7,608,122 B2 * | 10/2009 | Snyde | 55/306 |
| 2003/0024232 A1 | 2/2003 | Snyder et al. |
| 2003/0024233 A1 | 2/2003 | Snyder |
| 2005/0166571 A1 | 8/2005 | Marinella Pavlatos |

FOREIGN PATENT DOCUMENTS

| | | |
|---|---|---|
| GB | 2270481 | 3/1994 |

OTHER PUBLICATIONS

International Searching Authority. PCT International Search Report and Written Opinion of the International Searching Authority, PCT/US06/23883, Mar. 15, 2007.

* cited by examiner

CLUSTERED INLET PARTICLE SEPARATOR

CROSS-REFERENCE TO RELATED APPLICATIONS

The present application is a continuation of PCT Patent Application No. PCT/US06/023883 filed Jun. 20, 2006, which claims the benefit of U.S. Provisional Patent Application No. 60/692,428 filed Jun. 20, 2005, each of which is incorporated herein by reference.

BACKGROUND

The present invention relates generally to particle separators and more particularly, but not exclusively, to inertial particle separators for application with gas turbine engines.

Particle separators are operable to separate undesirable materials from air entering a turbine engine. Such undesirable materials may adversely affect the internal working components of the gas turbine engine if they were allowed to enter the engine. Presently, many particle separator designs have a variety of shortcomings, drawbacks and disadvantages. Accordingly, there is a need for the unique and inventive particle separators according to the present invention.

SUMMARY

One embodiment according to the present invention is a unique particle separator for a gas turbine engine. Other embodiments include unique apparatuses, systems, devices, hardware, methods, and combinations of these for particle separation in gas turbine engines. Further embodiments, forms, objects, features, advantages, aspects, and benefits of the present invention shall become apparent from the following description and drawings.

DETAILED DESCRIPTION OF ILLUSTRATIVE EMBODIMENTS

Figure 1:
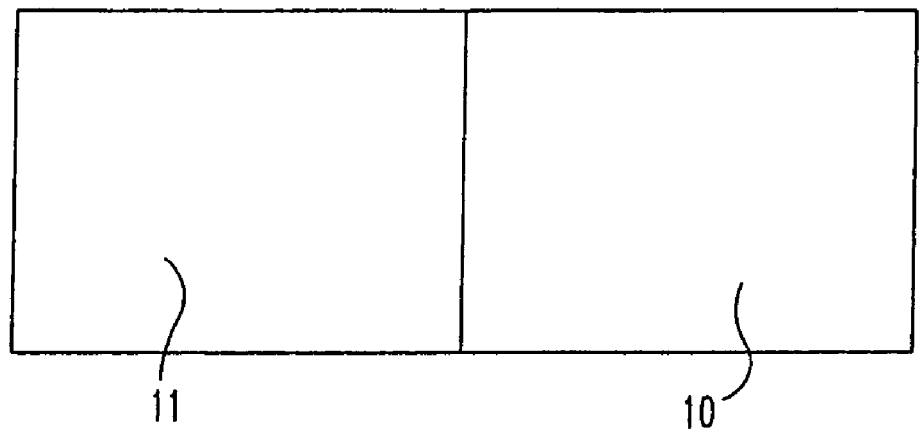
FIG. 1 is a block diagram depicting a gas turbine engine and a particle separator operatively coupled thereto.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention is illustrated therein being contemplated as would normally occur to one skilled in the art to which the invention relates.

With reference to FIG. 1, there is illustrated a block diagram depicting a gas turbine engine 10 operatively coupled with an inertial particle separator 11. The particle separator 11 is arranged to separate matter, such as, but not limited to sand, dust, dirt, liquids, and/or any particulate matter, all of which are referred to as particles, from the air that passes through the particle separator 11 to an inlet of the gas turbine engine 10. In one form the particle separator 11 is incorporated into an aircraft. The term aircraft includes, but is not limited to, helicopters, airplanes, unmanned space vehicles, fixed wing vehicles, variable wing vehicles and others. Further, the present inventions are contemplated for utilization in other applications that may not be coupled with an aircraft such as, for example, industrial applications, power generation, pumping sets, naval propulsion, hover crafts, vehicles and other applications known to one of ordinary skill in the art.

Figure 2:
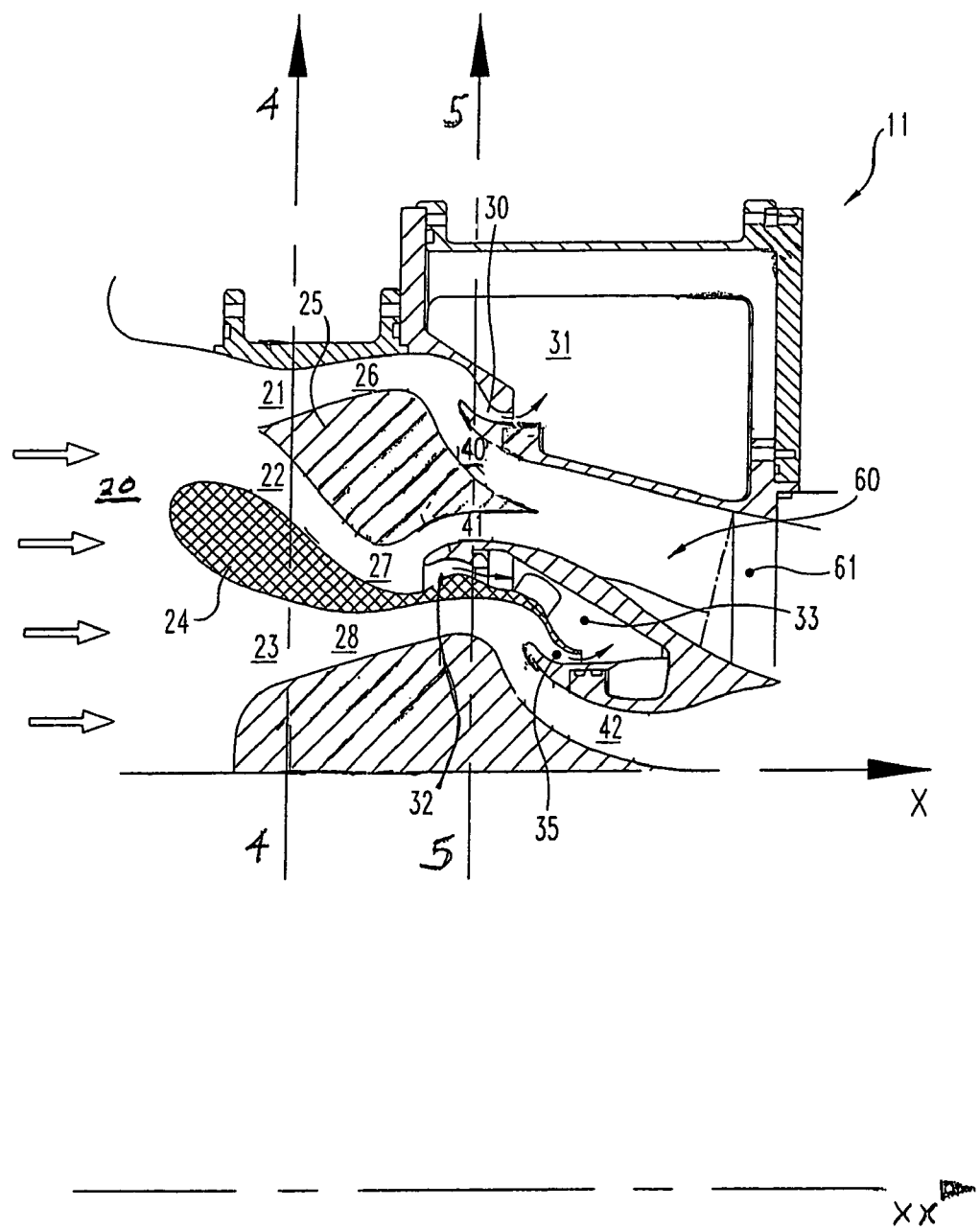
FIG. 2 is a partial sectional view of one embodiment of a particle separator for use in connection with a gas turbine engine.

With reference to FIG. 2, there is set forth an illustrative partial sectional view of one embodiment of the particle separator 11. In one form the particle separator 11 is symmetrical about the centerline X. Particle separator 11 may be symmetrical about an engine centerline XX or may be offset therefrom. The particle separator 11 has an inlet 20 extending around the particle separator 11 and which is adapted to allow the passage of air therein. The inflow of air entering the inlet 20 may include other material and contaminants such as but not limited to sand, dirt, dust, liquids, foreign objects and or any other particular matter. Inlet 20 may take on a variety of cross sectional shapes and configurations, for example, annular, polygonal, circular, kidney, oval, parabolic, tear or eye shaped, and a variety of other configurations, including those which are partially, substantially, essentially, approximately, or nearly in conformance with the foregoing, and also including combinations and blends of the foregoing.

The flow of air passing through the inlet 20 and into the particle separator 11 is divided into three flow streams that pass through flowpaths 21, 22 and 23 which are preferably annular but can be of a variety of other shapes and configurations such as those mentioned above. Flowpaths 21, 22 and 23 are spaced radially apart. Dividers 24 and 25 divide the inlet flowpath into separated flowpaths 21, 22 and 23 that each receive a respective air flow stream 26, 27 and 28. Dividers 24 and 25 are preferably annular, but can be of a variety of other cross-sectional shapes such as those mentioned above. In one form the particle separator includes the three flowpaths 21, 22 and 23 that are relatively tightly clustered in a radial direction. In other forms the flow paths can include a variety of other shapes, spacings, configurations, and forms including, for example, those mentioned above. In the illustrated embodiment flowpaths 21, 22 and 23 each include a curved branched portion that facilitates the separation of materials and/or particles from the respective air flow stream.

The inertia of the materials and/or particles in the air flow stream 26 tends to cause the particles and/or materials to flow through an opening 30 into an outer scavenge conduit 31. Scavenge conduit 31 extends around the particle separator 11 and, in addition to the illustrated embodiment, could assume a variety of shapes, dimensions, configurations, and forms adapted for receiving particles and/or materials from the air flow within the particle separator. The inertia of the materials and/or particles in the flow stream 27 tends to cause the particles and/or materials to flow through an opening 32 into an inner scavenge conduit 33. The inner scavenge conduit 33 extends around the particle separator 11 and is adapted for receiving particles and/or materials from the air flow within the particle separator 11.

The inertia of the materials and/or particles in the flow stream 28 tends to cause the particles and/or materials to flow through an opening 35 into the inner scavenge conduit 33.

The particles and/or materials from the air flow streams 28 and 27 within flowpaths 23 and 22 is migrated into the inner scavenge conduit 33 and the particles and/or materials from air flow stream 26 within flowpath 21 is migrated into the outer scavenge conduit 31. The clean air flow passes through passageways 40, 41 and 42 to the inlet of the gas turbine engine 10. The reader will understand that clean is a relative term and the air flow passing through passageways 40, 41 and 42 may contain some contaminants and/or particulate matter. A variety of different interconnections between engine 10 and particle separator 11 are contemplated. For example, with a direct interconnection or coupling, or with one or more intermediate structures. The term scavenged and/or scavenged air will be utilized herein to also refer to the separated material and/or particles and the air including the separated material and/or particles.

In the illustrated embodiment particles entering flowpath 21 tend to encounter the radially outer surface of that flowpath, and, due to a tendency to avoid changes in direction, tend to travel along that surface resulting in their being scavenged as described above. Particles entering flowpath 22 tend to encounter the radially inner surface of that flowpath, and, due to a tendency to avoid changes in direction, tend to travel along that surface resulting in their being scavenged as described above. Particles entering flowpath 23 tend to encounter the radially outer surface of that flowpath, and, due to a tendency to avoid changes in direction, tend to travel along that surface resulting in their being scavenged as described above. Let it be understood, however, that the illustrated embodiment is only one example according to the present invention.

In one form of the present invention at least one strut or conduit 60 extends across the clean air flow path 61 to provide a material flow path for the materials and/or particles in inner scavenge conduit 33. The conduit 60 allows the materials and/or particles to flow from the inner scavenge conduit 33 to the outer scavenge conduit 31. In one form the present invention includes a plurality of conduits 60 for providing the material flow path for the removal of the accumulated materials and/or particles. The materials and/or particles are discharged from the outer scavenge conduit 31 away from the inlet particle separator 11. In one aspect the conduits 60 may also function as a structural member(s) between the annular flowpath defining walls. In another form of the present invention a plurality of struts allow for the passage of the materials and/or particles radially inward from the conduits 31 and 33 where they meet and flow through a central passage to be discharged from the particle separator 11 away from the engine inlet.

Figure 3:
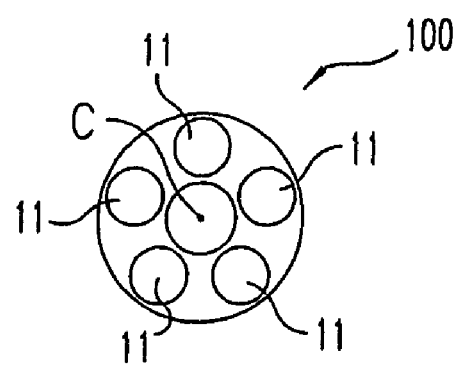
FIG. 3 is a schematic end view of a plurality of inlet particle separators.

With reference to FIG. 3, there is illustrated a schematic end view of an inlet particle unit 100 including a plurality of inlet particle separators 11. In one form the inlet particle unit 100 is placed around the front annulus of a gas turbine engine compressor. In one form there are five inlet particle separators 11 located around the centerline of the compressor shaft C. However, the present invention contemplates that the particle separator may be used singularly or in a clustered manner. The quantity of particle separators clustered in the inlet particle unit can vary based upon many factors including the need, operating environment and/or size of the gas turbine engine.

Figure 4:
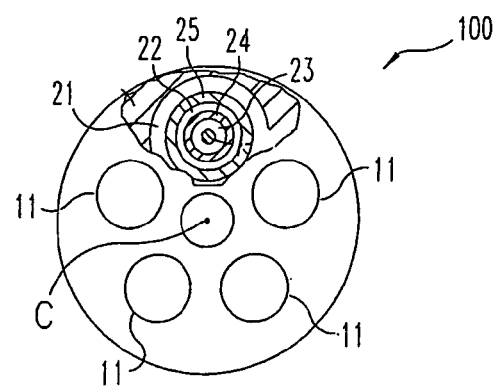
FIG. 4 is an illustrative partial sectional view of one of the plurality of particle separators of the schematic of FIG. 3 taken along the line 4-4 of FIG. 2.

With reference to FIG. 4, there is depicted an illustrative partial sectional view of one of the plurality of particle separators of the schematic of FIG. 3, taken along the line 4-4 of FIG. 2. Certain features shown in FIG. 4 are labeled with reference numerals identical to those used above. The description provided above will enable the reader to review the figure and obtain a further appreciation of aspects of the present inventions.

Figure 5:
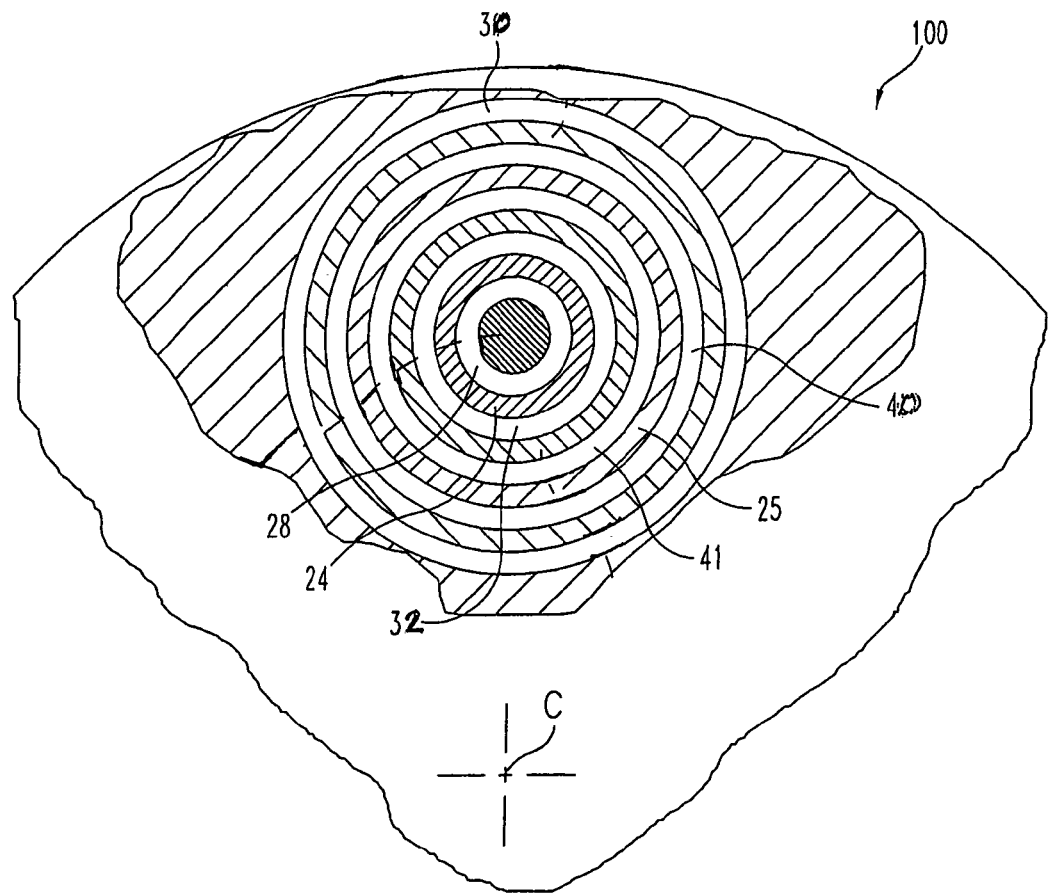
FIG. 5 is an illustrative partial sectional view of one of the plurality of particle separators of the schematic of FIG. 3 taken along the line 5-5 of FIG. 2.

With reference to FIG. 5, there is depicted an Illustrative partial sectional view of one of the plurality of particle separators of the schematic of FIG. 3 taken along line 5-5 of FIG. 2. Certain features shown in FIG. 5 are labeled with reference numerals identical to those used above. The description provided above will enable the reader to review the figure and obtain a further appreciation of aspects of the present inventions.

One form of the present invention contemplates an apparatus comprising: a gas turbine engine including an engine inlet; and a plurality of particle separators in flow communication with said engine inlet, each of said particle separators comprising: a flow inlet adapted to receive air flow therein; two flow dividers operable to divide the air flow from the inlet; and three flow scavengers for scavenging a portion of the air flow from said dividers. Another form of the apparatus further includes that each of said particle separators includes three radially spaced flowpaths, and each of said scavengers is in flow communication with one of said radially spaced flowpaths. Another form of the apparatus further includes an inner scavenge duct and an outer scavenge duct, each of said scavenge ducts is disposed in flow communication with at least one of said scavengers. Another form of the apparatus further includes an inner scavenge duct and an outer scavenge duct, each of said scavenge ducts is disposed in flow communication with at least one of said scavengers and which further includes a material flow conduit disposed between said inner scavenge duct and said outer scavenge duct, said material flow conduit adapted for the passage of a quantity of the portion of air scavenged from said scavenger. In another form of the apparatus said particle separators are inertial particle separators, said flow inlet is substantially annular, and said flow dividers are substantially annular. In another form of the apparatus one flow divider tends to direct material flow toward a substantially radially outward facing surface and at least one other flow divider tends to direct material toward a substantially radially inward facing surface.

Another form of the present invention contemplates an inertial particle separator for separating material entrained in a flow of air, comprising: a centerbody; an outer wall extending circumferentially around said centerbody; a flowpath defined between said outer wall and said centerbody; a pair of flow directors located within said flowpath and separating at least a portion of said flowpath into three radially spaced flowpaths; and a plurality of flow splitters, one of said plurality of flow splitters disposed in flow communication with each of said three radially spaced flowpaths. Another form of the particle separator further includes a first receiving duct disposed in flow communication with two of said three radially spaced flowpaths; and a second receiving duct disposed in flow communication with the other of said three radially spaced flowpaths. Another form of the particle separator includes a first receiving duct disposed in flow communication with two of said three radially spaced flowpaths; and a second receiving duct disposed in flow communication with the other of said three radially spaced flowpaths and a material flow passageway connected between said first receiving duct and said second receiving duct. Yet another form of the particle separator includes a first receiving duct disposed in flow communication with two of said three radially spaced flowpaths; and a second receiving duct disposed in flow communication with the other of said three radially spaced flowpaths and a material flow passageway connected between said first receiving duct and said second receiving duct and said first receiving duct is defined as an inner duct and said second receiving duct is defined as an outer duct, said inner duct located radially inward of said outer duct. Yet another form of the particle separator includes a first receiving duct disposed in flow communication with two of said three radially spaced flowpaths; and a second receiving duct disposed in flow communication with the other of said three radially spaced flowpaths and a material flow passageway connected between said first receiving duct and said second receiving duct and said first receiving duct is defined as an inner duct and said second receiving duct is defined as an outer duct, said inner duct located radially inward of said outer duct and wherein said three radially spaced flowpaths defines an inner, intermediate and outer flowpath; wherein said inner duct is in flow communication with said inner and intermediate flowpaths; wherein said three radially spaced flowpaths are annular. Another form of the particle separator includes wherein one of said pair of flow directors has a blunt upstream end. In yet another form the particle separator includes that each of said flow directors has an upstream end, and one of said upstream ends is located fore the other of said upstream ends. In yet another form the particle separator further includes an output for discharging particles from the particle separator. In yet another form the particle separator of claim 7 includes that the flowpaths are substantially annular. In yet another form of the particle separator one of the flow directors has a relatively blunt upstream flow director end, another of the flow directors has a relatively pointed upstream flow director end, and one of said upstream flow director ends is located fore the other of said upstream flow director ends.

Another form of the present invention contemplates a method comprising: flowing a fluid through an intake of a gas turbine engine particle separator; separating the fluid into three radially spaced fluid flows that are defined as a first flow amount, a second flow amount and a third flow amount; routing the first flow amount through a first flow passage, the second flow amount through a second flow passage, and the third flow amount through a third flow passage; and scavenging a portion of the first flow amount, a portion of the second flow amount, and a portion of the third flow amount. Another method further includes wherein the routing is accomplished at least in part by first and second means for routing flowing fluid. In yet another method there is further included that said scavenging is accomplished at least in part by means for scavenging particulate matter of a flowing fluid. In yet another method there is further includes wherein said routing is accomplished at least in part by first and second means for routing flowing fluid; said scavenging is accomplished at least in part by means for scavenging particulate of a flowing fluid, the means for scavenging operates based upon inertia of particles; and further comprises routing scavenged matter to an outlet.

Another form of the present invention contemplates an apparatus comprising: a gas turbine engine including an engine inlet; and an inertial particle separator in flow communication with said engine inlet, said particle separator comprising: an inlet air flow path; two annular flow dividers operable to divide at least a portion of the inlet air flow path into radially spaced annular flow paths; and three flow scavengers for scavenging a portion of the air flow from said annular flow paths.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
   a gas turbine engine including an engine inlet; and
   a plurality of particle separators in flow communication with said engine inlet, each of said particle separators comprising:
   a flow inlet adapted to receive air flow therein;
   two flow dividers operable to divide the air flow from the inlet; and
   three flow scavengers for scavenging a portion of the air flow from said dividers;
   an inner scavenge duct and an outer scavenge duct, wherein one of the inner scavenge duct and the outer scavenge duct receives flow from a plurality of the flow scavengers.

2. The apparatus of claim 1, wherein each of said particle separators includes three radially spaced flowpaths, and each of said scavengers is in flow communication with one of said radially spaced flowpaths.

3. The apparatus of claim 1, which further includes a material flow conduit disposed between said inner scavenge duct and said outer scavenge duct, said material flow conduit adapted for the passage of a quantity of the portion of air scavenged from said scavengers.

4. The apparatus of claim 1, wherein said particle separators are inertial particle separators, said flow inlet is substantially annular, and said flow dividers are substantially annular.

5. The apparatus of claim 1, wherein one flow divider tends to direct material flow toward a substantially radially outward facing surface and at least one other flow divider tends to direct material toward a substantially radially inward facing surface.

6. An apparatus comprising:
   a gas turbine engine including an engine inlet; and
   an inertial particle separator in flow communication with said engine inlet, said particle separator comprising:
   an inlet air flow path;
   two annular flow dividers operable to divide at least a portion of the inlet air flow path into radially spaced annular flow paths;
   three flow scavengers for scavenging a portion of the air flow from said annular flow paths; and
   wherein a downstream portion of a first of the annular flow dividers is shaped to provide a dirty flow into two of the three flow scavengers.

* * * * *